Patented Nov. 3, 1931

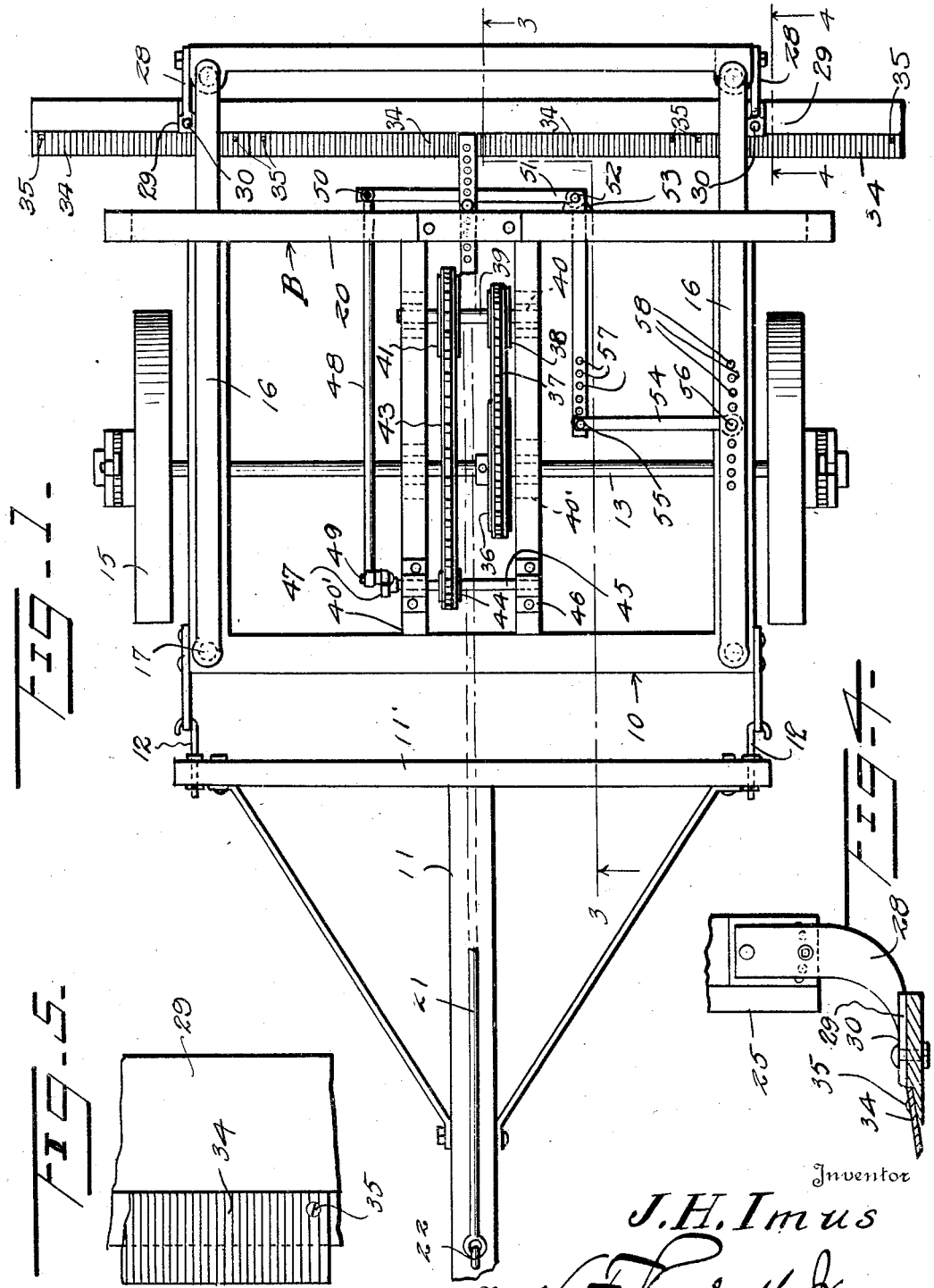

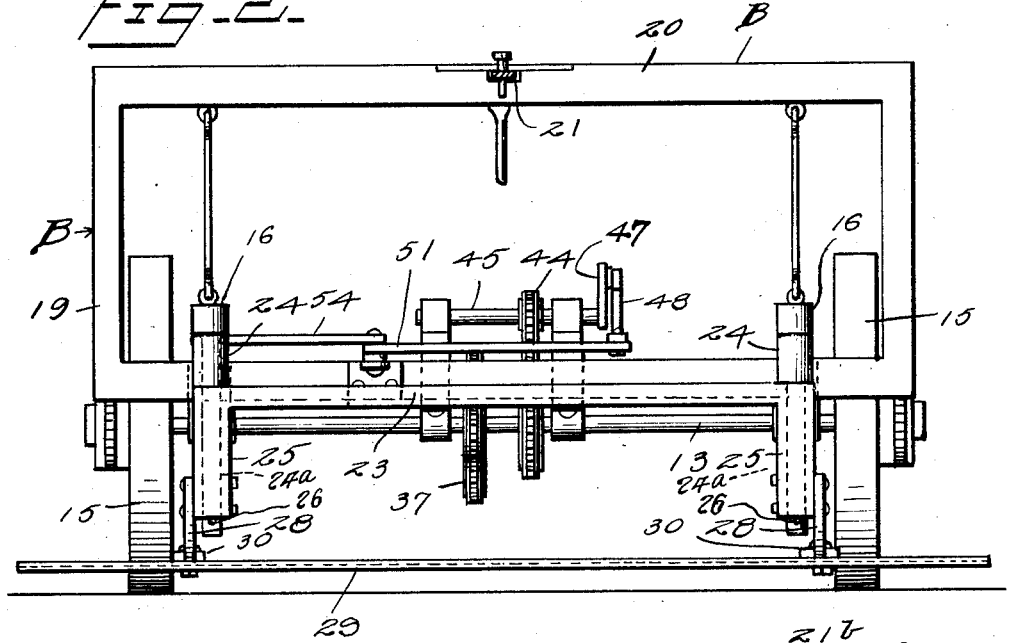
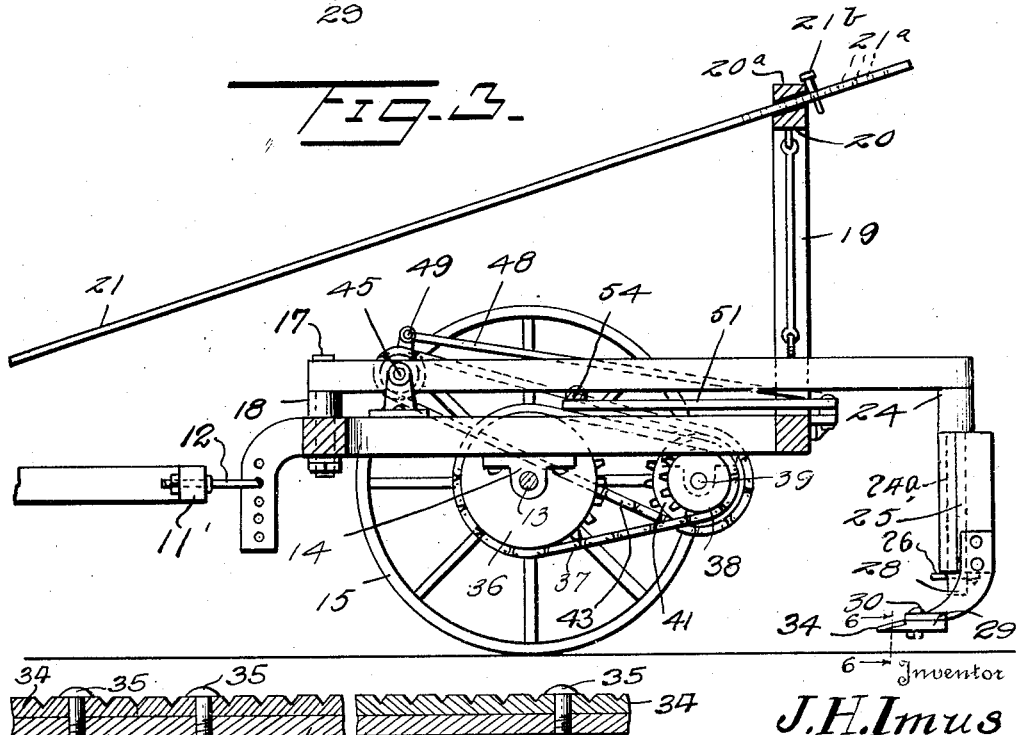

1,829,934

UNITED STATES PATENT OFFICE

JAMES H. IMUS, OF PENDLETON, OREGON

WEEDER

Application filed August 16, 1928. Serial No. 299,995.

This invention relates to a weeder.

It is particularly aimed to provide a weeder which is substantially free of the danger of clogging and which may be easily dumped or cleaned.

Another important object is to provide a weeder primarily adapted for cutting large weeds, wherein the blade has a reciprocatory motion and is driven by novel oscillating means.

A further object is to provide a construction wherein the blade is corrugated with a view to minimizing clogging and which blade may be made up of sections capable of individual removal and substitution.

Additional objects and advantages will become apparent from a consideration of the description following taken in connection with accompanying drawings illustrating an operative embodiment.

In said drawings:—

Figure 1 is a plan view of the improved weeder,

Figure 2 is a rear elevation thereof,

Figure 3 is a sectional view taken on the line 3—3 of Figure 1,

Figure 4 is a sectional view taken on the line 4—4 of Figure 1,

Figure 5 is fragmentary plan view of one of the blade sections and its mounting, and Figure 6 is a sectional view taken on the line 6—6 of Figure 3.

Referring specifically to the drawings, the weeder may consist of a generally rectangular frame 10 which is horizontally disposed and has a draft tongue or bar 11 provided with a tree 11' pivotally and detachably connected to frame 10 by hook means as at 12. An axle 13 which constitutes a power shaft is journaled in bearings at 14 secured to the under surface of the frame 10 and said axle has ground wheels 15 keyed thereto.

Laterally oscillatory arms or levers 16 are pivoted above and to the sides of frame 10 by means of vertical or king bolts at 17, and between which frame and levers, spacing and friction reducing collars 18 may be provided.

The frame 16 extends rearwardly intermediate vertical bars or frame members 19 of a one-piece rectangular frame B rigid or integral with the frame 10. Frame B at the top, has a bar 20. A rod 21 extends forwardly and downwardly from the bar 20 and is pivotally connected at 22 to the draft tongue 11. Rod 21 is operable to vary the depth at which a weed cutter operates and is slidable through an inclined slot 20ª in bar 20 and has holes 21ª selectively engageable by a pin 21ᵇ.

At the rear of the machine, a cutter frame member 23 is provided and arranged vertically. Such frame has depending posts 24 with reduced extensions 24ª engaging the tubular members 25 mounted thereon. 26 designates pins engaging through transverse openings in reduced extensions 24ª to hold the cutter frame 23 supported thereon.

Fastened to socket members 25 are brackets 28 having a mounting plate 29 for the cutter blade bolted thereto at 30. While such blade may be made in a single piece, it is preferably made in a plurality of sections 34, detachably bolted at 35 to the plate 29. The upper surfaces of such blade sections 34 are corrugated so as to minimize the chances of weeds remaining thereon and clogging their operation. The cutting edges of the sections 34 face the wheels 15. In the event one of the sections 34 should become unduly worn, it may be removed and a new one substituted through the manipulation of the bolts 35.

The oscillation of the arms 16 provides a lateral oscillation or reciprocation for the cutter sections 34 so that they may cut or remove the weeds. In order to oscillate such arms 16, the shaft 13 has a sprocket 36 keyed thereto which is traversed by a sprocket chain 37 which also passes over a sprocket 38 rigid with a shaft 39 journaled in bearings 40 on beams 40' of the frame 10. A sprocket wheel 41 keyed on the shaft 39 drives a chain 43 which drives a sprocket 44 and countershaft 45 journaled in bearings 46 on the beams 40'. A disk or crank 47 is rigid with the shaft 45 and it has a pitman 48 pivotally connected thereto by means of a removable bolt 49. Pitman 48 is pivoted at 50 to a bell crank lever 51 pivoted at 52 to a bracket 53 on frame 10.

A link 54 is pivoted at 55 and 56 respectively to bell crank 51 and one arm 16, passing respectively through any selected openings of series of openings 57 and 58 to obtain the proper throw for the pitman.

The weeder may be operated singly through the medium of suitable draft means attached to the tongue 11 or it may be used in plurality like the weeder sections disclosed in Letters Patent 1,637,862 granted to me on August 2, 1927.

As a result of the construction described as the machine advances, the wheels 15 through traction with the ground operate the shaft 13 and through the medium of the gearing traced, turns crank 44 so as to reciprocate the pitman 48 and accordingly oscillate the lever 51 and arms 16 from axes 17 and thereby oscillate or reciprocate the cutter means laterally. The construction is such that the machine will readily cut large weeds as well as small ones, is not likely to clog and may be readily cleaned.

Various changes may be resorted to provided they fall within the spirit and scope of the invention.

I claim as my invention :—

1. A weeder comprising a main frame having an elevated portion at the rear thereof, traction means therefor, laterally oscillatable means pivoted to the main frame and movable below said portion, means suspending said oscillatable means from said portion of the main frame, means to oscillate the second means from said traction means, and a transverse cutter carried by the second means at the rear of the frame.

2. A weeder of the class described comprising a main frame and a transversely disposed frame having an open vertical portion, arms pivoted for horizontal movement on the main frame and passing rearwardly through said open portion, traction means for the main frame, gearing driven by said traction means to oscillate the arms, and a transverse cutter carried by the arms rearwardly of the frames.

3. A weeder comprising a main frame, an axle journaled thereon provided with ground wheels, a vertical frame on the main frame adjacent the rear thereof, arms pivoted to the first frame and extending longitudinally through and beyond the latter frame, means on the latter frame suspending the arms, gearing driven from said axle including a crank, a transversely disposed cutter carried by the arms rearwardly of the frames, and a pitman extending from said crank to one of the arms operable to oscillate the cutter.

In testimony whereof I affix my signature.

JAMES H. IMUS.